US010975541B2

(12) United States Patent
Lindblade et al.

(10) Patent No.: US 10,975,541 B2
(45) Date of Patent: Apr. 13, 2021

(54) OFFSHORE STRUCTURE MATING SYSTEM AND INSTALLATION METHOD

(71) Applicant: SOFEC, INC., Houston, TX (US)

(72) Inventors: Stephen P. Lindblade, Waller, TX (US); Ananth Natarajan, Houston, TX (US)

(73) Assignee: SOFEC, INC., Houston, TX (US)

( * ) Notice: Subject to any disclaimer, the term of this patent is extended or adjusted under 35 U.S.C. 154(b) by 0 days.

(21) Appl. No.: 15/695,802

(22) Filed: Sep. 5, 2017

(65) Prior Publication Data

US 2019/0071830 A1   Mar. 7, 2019

(51) Int. Cl.
    *B63B 35/00*   (2020.01)
    *E02B 17/00*   (2006.01)
    (Continued)

(52) U.S. Cl.
    CPC ............ *E02B 17/024* (2013.01); *B63B 35/44* (2013.01); *E02B 17/027* (2013.01); *F03D 13/10* (2016.05);
    (Continued)

(58) Field of Classification Search
    CPC ...... E02B 17/021; E02B 17/024; E02B 17/08; E02B 17/0809; E02B 17/0836–17/089; E02B 2017/0039; E02B 2017/0043; E02B 2017/0047; E02B 2017/0091; B63B 35/003; B63B 35/44; B63B 2035/446;
    (Continued)

(56) References Cited

U.S. PATENT DOCUMENTS 3,419,090 A  *  12/1968  Dorn .................... B63B 35/4413
                                                          114/264
4,854,779 A     8/1989  Luyties
                         (Continued)

FOREIGN PATENT DOCUMENTS

CN          203844964 U       9/2014
WO          2010032044        3/2010

OTHER PUBLICATIONS

International Search Report and Written Opinion of corresponding PCT/US2018/045193 dated Oct. 29, 2018.
(Continued)

*Primary Examiner* — Benjamin F Fiorello
*Assistant Examiner* — Stacy N Lawson
(74) *Attorney, Agent, or Firm* — Edmonds & Cmaidalka, P.C.

(57) ABSTRACT

A system and method for mating equipment offshore to a spar buoy secured to a foundation without the use of a crane barge. The system comprises a floating vessel having a pair of forks defining a slot. A gimbal table, defining an opening, is positioned within the slot and connected to the vessel and a locking collar is mounted to the gimbal table. A mating member is attached to the spar buoy. The vessel is maneuvered to bring the spar buoy within the gimbal table opening. With the spar buoy positioned within the gimbal table opening, the locking collar is arranged and designed to releasably attach to the mating member of the spar buoy and restrict relative vertical motion between the spar buoy and the vessel while the gimbal table allows the floating vessel to roll and pitch without driving these motions into the spar buoy.

23 Claims, 7 Drawing Sheets

(51) Int. Cl.
| | |
|---|---|
| *B63B 9/06* | (2006.01) |
| *B63B 35/44* | (2006.01) |
| *E02B 17/02* | (2006.01) |
| *F03D 13/25* | (2016.01) |
| *F03D 13/10* | (2016.01) |
| *B63B 21/50* | (2006.01) |
| *B63B 75/00* | (2020.01) |

(52) U.S. Cl.
CPC .............. *F03D 13/25* (2016.05); *B63B 75/00* (2020.01); *B63B 2021/505* (2013.01); *B63B 2035/442* (2013.01); *B63B 2035/446* (2013.01); *E02B 2017/0043* (2013.01); *E02B 2017/0047* (2013.01); *E02B 2017/0065* (2013.01); *E02B 2017/0091* (2013.01); *F05B 2230/6102* (2013.01)

(58) Field of Classification Search
CPC .............. B63B 2021/505; B63B 27/30; B63B 2009/067; B63B 21/507; F03D 13/10; F03D 13/25; F03D 13/40; F05B 2230/6102; F05B 2240/93; F05B 2240/95
See application file for complete search history.

(56) References Cited

U.S. PATENT DOCUMENTS

| | | | |
|---|---|---|---|
| 5,803,668 A | 9/1998 | Seki et al. | |
| 6,968,797 B2 | 11/2005 | Persson | |
| 8,016,519 B2 | 9/2011 | Ingham et al. | |
| 8,118,538 B2 | 2/2012 | Pao | |
| 8,192,160 B2 | 6/2012 | Garcia Lopez et al. | |
| 8,197,208 B2 | 6/2012 | Sharples et al. | |
| 8,235,629 B2 | 8/2012 | Jakubowski | |
| 8,313,266 B2 | 11/2012 | Numajiri | |
| 8,729,723 B2 | 5/2014 | Boureau et al. | |
| 9,022,691 B2 | 5/2015 | Westergaard | |
| 9,238,896 B2 | 1/2016 | Borrell et al. | |
| 9,523,355 B2 | 12/2016 | Taub | |
| 9,702,205 B2 | 7/2017 | Jansen et al. | |
| 9,725,870 B2 | 8/2017 | Liu et al. | |
| 2005/0206168 A1 | 9/2005 | Murakami et al. | |
| 2008/0240864 A1 | 10/2008 | Belinsky | |
| 2008/0277123 A1* | 11/2008 | Baross | B63B 21/507 166/354 |
| 2011/0139056 A1* | 6/2011 | Cholley | B63B 27/04 114/264 |
| 2012/0189390 A1* | 7/2012 | Belinsky | B63B 21/50 405/204 |
| 2012/0266796 A1* | 10/2012 | Roodenburg | B63B 35/003 114/61.14 |
| 2013/0051924 A1* | 2/2013 | Willis | F03D 13/40 405/195.1 |
| 2013/0224020 A1 | 8/2013 | Dagher et al. | |
| 2014/0064856 A1* | 3/2014 | Westergaard | B63B 35/003 405/204 |
| 2015/0158704 A1 | 6/2015 | Giles et al. | |
| 2015/0321734 A1* | 11/2015 | Woldring | F16L 1/205 414/139.6 |
| 2016/0160836 A1* | 6/2016 | Liu | E02D 27/52 405/204 |
| 2017/0241096 A1* | 8/2017 | Van Grieken | B63B 9/065 |

OTHER PUBLICATIONS

English Machine Translation of Chinese Utility Patent No. CN 203844964.

Extended European Search Report for European application No. 18854180.9 dated Apr. 8, 2020.

* cited by examiner

OFFSHORE STRUCTURE MATING SYSTEM AND INSTALLATION METHOD

CROSS REFERENCE TO RELATED APPLICATIONS

Not applicable.

BACKGROUND OF THE INVENTION

1. Field of the Invention

The present invention generally relates to a method and system for installing equipment offshore on a floating hull, and more particularly relates to a method and system for installing a wind turbine generator on a floating hull offshore without using a large offshore crane.

2. Description of the Related Art

In the field of floating offshore alternative energy projects, installation costs are significant enough to drive the project away from being economically feasible in certain environments. Typical installation of a topside component, such as a wind turbine, on a floating hull, such as a spar buoy, requires the use of a very expensive large offshore crane. The limited numbers of such cranes along with their operational and mobilization costs combine to drive up their expense and drive down their availability on demand.

The use of a standard barge/fork-type vessel for installation of the wind turbine can save substantial costs. However, the motion response to the wave environment of a spar buoy and a barge are very different. As a result, large relative motions between the spar buoy and the barge with the wind turbine generator may exist during installation, making it very difficult and dangerous to mate the wind turbine generator to the spar buoy.

Assignee's U.S. Pat. No. 9,725,870 B2 discloses an assembly and method of mating a wind turbine generator to a spar buoy without using a large offshore crane. The patent discloses two large trusses (one on the wind turbine generator and one on the spar buoy) containing stabbing guides and shock absorbers to reduce the loading forces during mating. Although a workable solution, the assembly is often too expensive because of the required adaptations to the spar buoy and wind turbine structure, which is an additional cost for every wind turbine generator installed on a spar buoy.

It is desirable to have an installation system and method of installing equipment offshore on a floating hull, such as a spar buoy, without using a large offshore crane. It is further desirable that the system and method be adapted for installing a wind turbine generator on the spar buoy. It is desirable that the system and method is cost effective, safe, is reusable and able to be performed in larger sea states.

SUMMARY OF THE INVENTION

The present invention is a system and method of installing equipment offshore on a floating hull, such as a spar buoy, without using a large offshore crane. The system and method is suitable for installing a wind turbine generator on a spar buoy in a cost effective, safe and timely manner. The invention makes use of a gimbal table that grips the spar buoy from the bow or stern of a fork-type vessel and thereby isolates the roll and pitch motions of the vessel from the spar buoy. This greatly reduces the relative motions and loads during mating and thereby reduces risks. It may also be configured to handle larger installation environments.

The preferred embodiment of the present invention also includes a support frame assembly that supports the wind turbine generator on the vessel during transport to the spar buoy. The support frame assembly is mounted on a spring system to allow the angular relative motions of the spar buoy to be absorbed between the support frame assembly and vessel during mating of the wind turbine generator to the spar buoy. The wind turbine generator can be lowered onto the spar buoy in a very controlled manner with greatly reduced relative motions and loads. This decreases the installation risks and enables installation in larger sea states.

BRIEF DESCRIPTION OF THE SEVERAL VIEWS OF THE DRAWINGS

The invention is better understood by reading the detailed description of embodiments which follow and by examining the accompanying drawings, in which.

DESCRIPTION OF THE PREFERRED EMBODIMENTS

Figure 1:
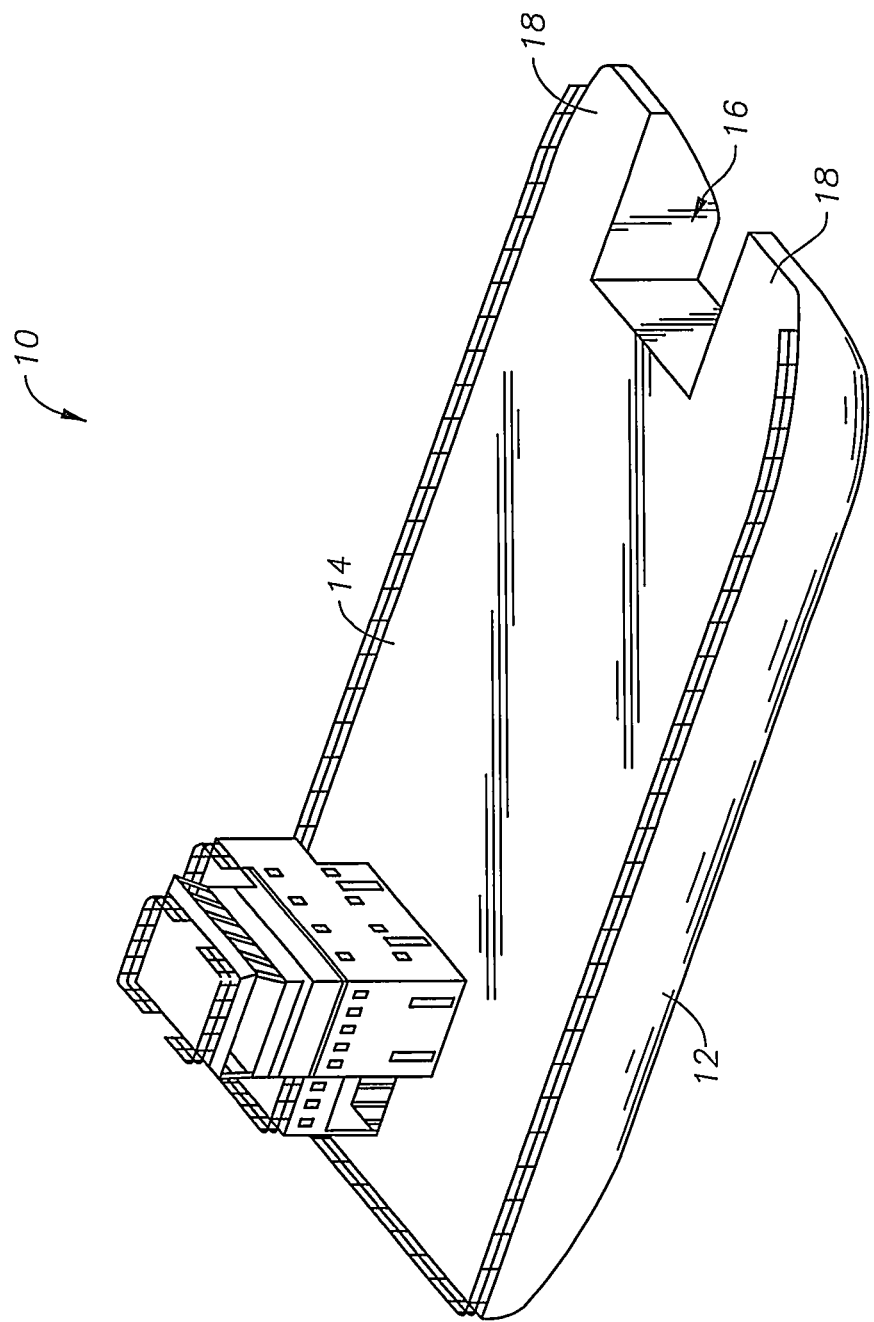
FIG. 1 is a perspective view of an exemplary embodiment of a fork-type transport vessel according to the invention.

The preferred embodiments of the present invention will now be described in detail with reference to the figures. FIG. 1 shows an exemplary embodiment of a transport vessel 10 according to the invention. The transport vessel 10 includes a hull 12 having a deck 14. A pair of forks 18 defining a slot 16 are formed in the hull 12 or extend from the hull 12. The forks 18 and slot 16 are preferably at the bow or stern of the fork-type vessel 10.

Figure 2:
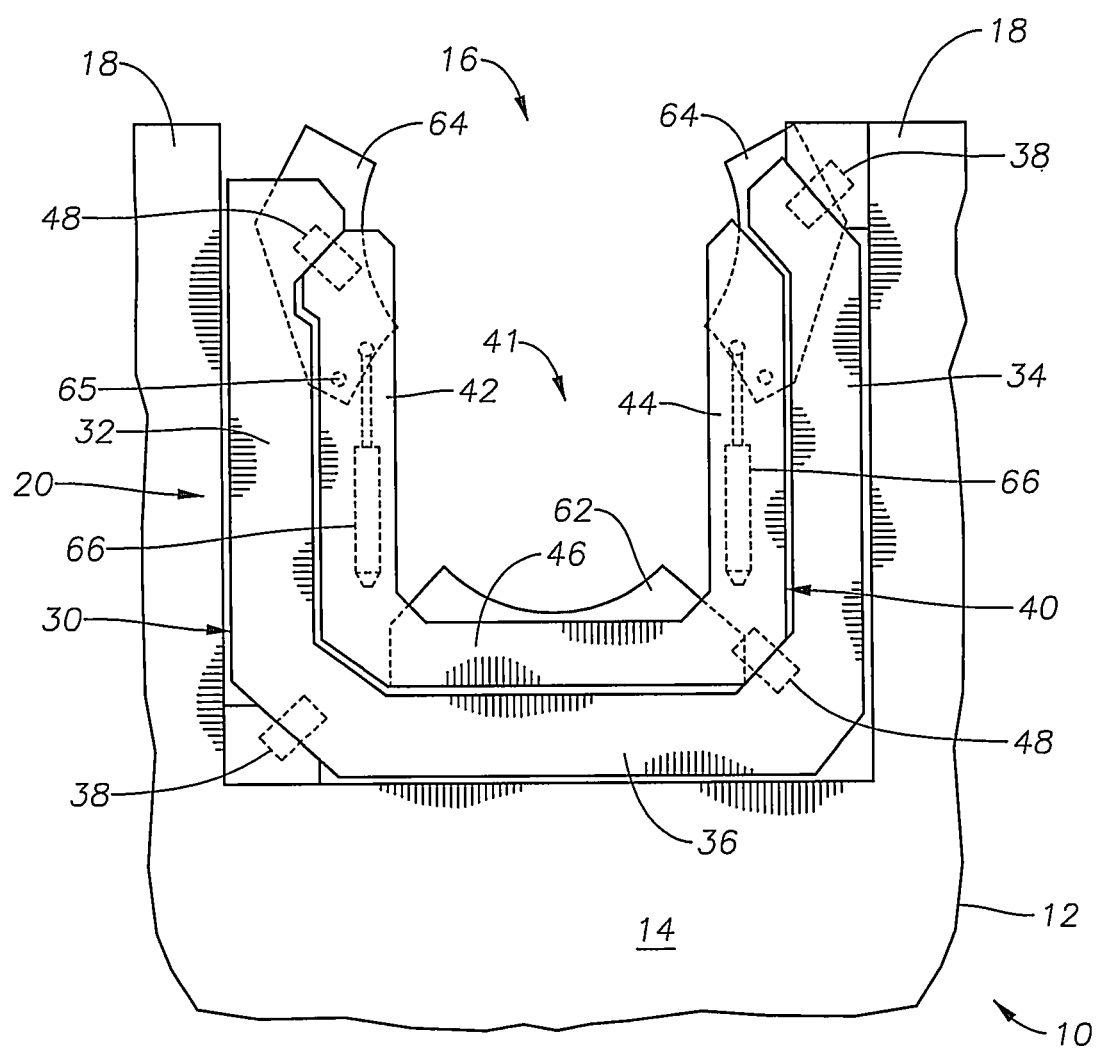
FIG. 2 is a plan view of a portion of the transport vessel showing the forks, a gimbal table and a spar locking collar in an open position.
Figure 3:
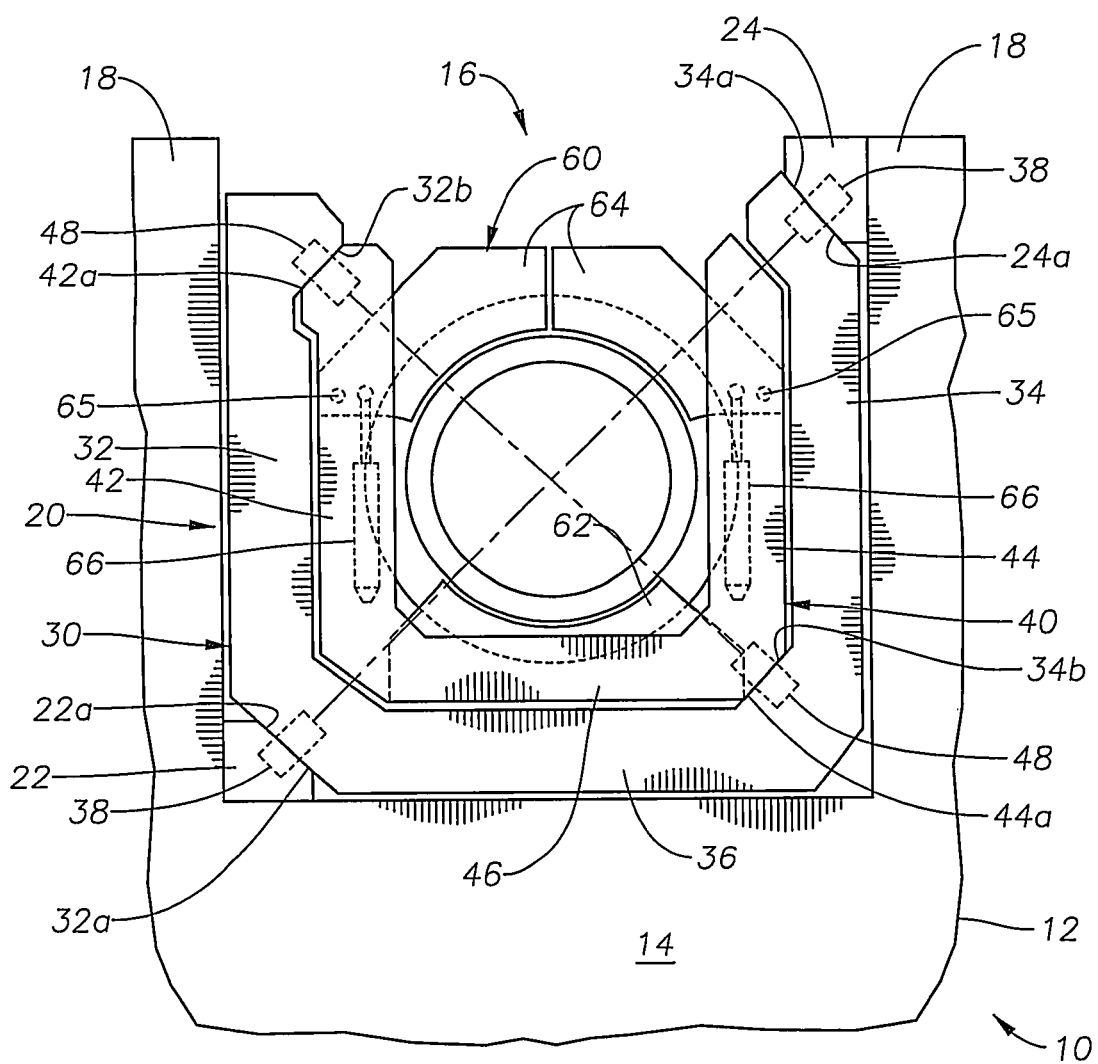
FIG. 3 is a plan view similar to FIG. 2 and showing the spar locking collar in a closed position secured to a spar buoy.
Figure 4:
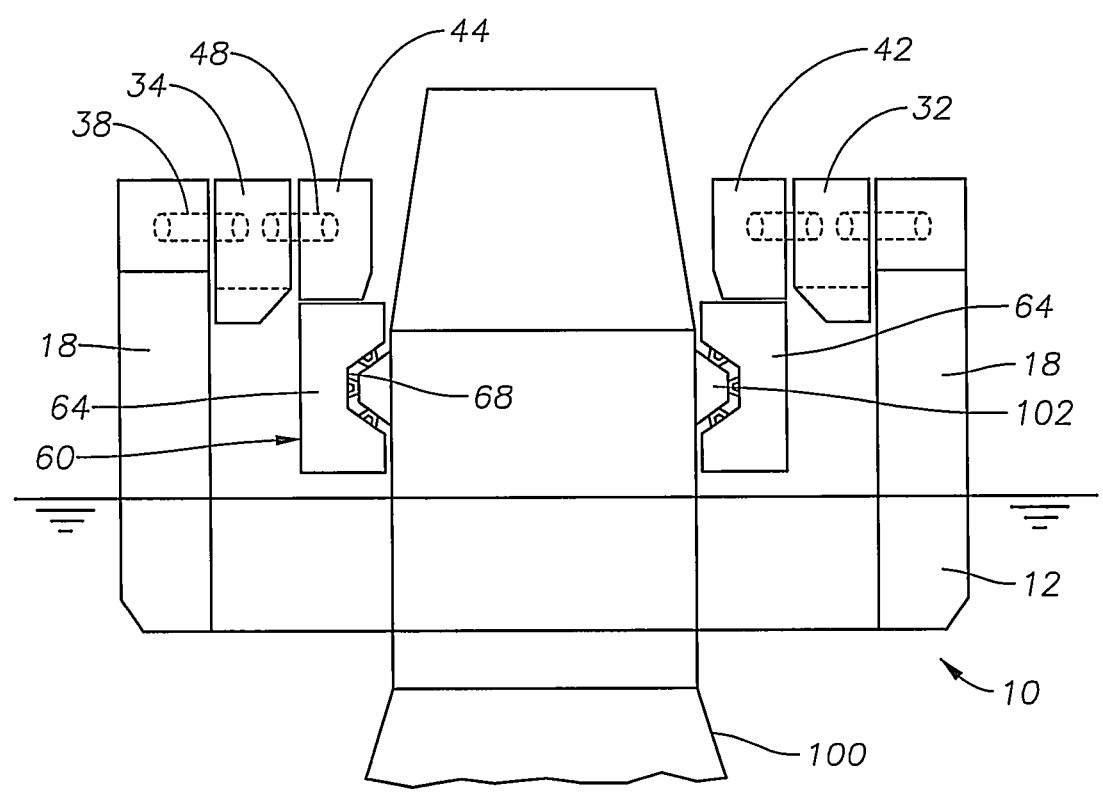
FIG. 4 is a partial elevation view of the vessel forks, gimbal table, spar locking collar and spar buoy.

In a preferred embodiment of the present invention, a gimbal table 20 is positioned within the slot 16 between the forks 18 as shown in FIGS. 2, 3 and 4. The gimbal table 20 includes two nested tables 30, 40 that are open-ended and located between (or on top of) the vessel forks 18. An outer table 30 is generally U-shaped in plan view as shown in FIGS. 2 and 3. The outer table 30 has outer first and second legs 32 and 34, substantially parallel to one another, extending generally transversely from an outer base segment 36. As shown in FIGS. 2, 3 and 4, preferably the outer table 30 fits within the slot 16 with a space existing between the outer legs 32, 34 and the forks 18.

The gimbal table 20 includes first and second mounting members 22 and 24, respectively, connected to the vessel 10. The mounting members 22 and 24 may be connected to the hull 12 and/or the forks 18 of the vessel 10. As shown in FIG. 3, the mounting members 22 and 24 each include an angled surface 22a and 24a, respectively, relative to a long axis of the vessel 10. Preferably, the angled surfaces 22a and 24a are parallel to each other and at a 45 degree (45°) angle with respect to the vessel long axis. Additionally, the outer table 30 includes first and second angled surfaces 32a and 34a, parallel to one another and in opposing relationship to angled surfaces 22a and 24a of the mounting members 22 and 24, respectively, as shown in FIG. 3.

Referring to FIGS. 2, 3 and 4, the outer table 30 is mounted to the vessel 10/forks 18 with a pair of outer shafts and bushings 38. The pair of outer shafts and bushings 38 are axially aligned with one another and in a horizontal plane.

Referring to FIGS. 2 and 3, an inner table 40, generally U-shaped in plan view, defines an opening 41. The inner table 40 has inner first and second legs 42 and 44, substantially parallel to one another, extending generally transversely from an inner base segment 46. As shown in FIG. 2, preferably the inner table 40 fits within the outer table 30 with a space existing between the inner and outer legs 42, 44 and 32, 34 respectively, and the inner and outer base segments 46 and 36, respectively.

As shown in FIG. 3, the outer table 30 includes third and fourth angled surfaces 32b and 34b, respectively, relative to the long axis of the vessel 10. Preferably, the third and fourth angled surfaces 32b and 34b are parallel to each other and perpendicular to the first and second angled surfaces 32a and 34a of the outer table 30. Additionally, the inner table 40 includes first and second angled surfaces 42a and 44a, parallel to one another and in opposing relationship to third and fourth angled surfaces 32b and 34b, respectively, of the outer table 30 as shown in FIG. 3.

Referring to FIGS. 2, 3 and 4, the inner table 40 is mounted to the outer table 30 with a pair of inner shafts and bushings 48. The pair of inner shafts and bushings 48 are axially aligned with one another and in a horizontal plane. Preferably, the axially aligned pair of inner shafts and bushings 48 is in the same horizontal plane as the axially aligned pair of outer shafts and bushings 38 and perpendicular with respect to one another.

As above described, the inner table 40 can articulate about two horizontal axis joints to allow gimballing of the inner table 40 with respect to the vessel 10. The first set of two shafts and bushings 38 along one horizontal axis is between the vessel 10 and the outer table 30. The second set of two shafts and bushings 48 along a horizontal axis perpendicular to the first axis is between the outer table 30 and the inner table 40.

Mounted beneath the inner table 40 is a spar locking collar 60 used to releasably attach the inner table 40 to the spar buoy 100 within the receptacle 41. Preferably, the spar locking collar 60 includes a fixed gripper 62 (FIGS. 2 and 3) affixed to the inner base segment 46 of the inner table 40 and two pivoting grippers 64 that are actuated with hydraulic cylinders 66 to capture the spar buoy 100 in the spar locking collar 60. The pivoting grippers 64 are pivotably attached to the inner legs 42, 44 via pivot pins 65. The hydraulic cylinders 66 are attached at one end to the inner legs 42, 44 and are attached at a second end to the pivoting grippers 64. FIG. 2 shows the pivoting grippers 64 of the spar locking collar 60 in an open position and FIG. 3 shows the pivoting grippers 64 in a closed position.

Referring to FIG. 4, the spar locking collar 60 defines a female-shaped receptacle 68 that grabs the male toroid-shape mating feature 102 on the spar buoy 100. This attachment takes place with relative motions between the spar buoy 100 and the inner table 40; therefore, the shape of the receptacle 68 accommodates these motions so that the inner table 40 will follow the motions of the spar buoy 100 during attachment. Fenders may be placed at this interface to absorb some of the initial impact energy. Once the spar locking collar 60 is closed, the inner table 40 is attached to the spar buoy 100 and the vertical relative motions between the spar buoy 100 and the inner table 40 are fixed. The vessel 10 can still roll and pitch without driving these angular motions into the spar buoy 100. Heave motion is driven, but the spar buoy 100 response to heave is relatively soft.

Figure 5:
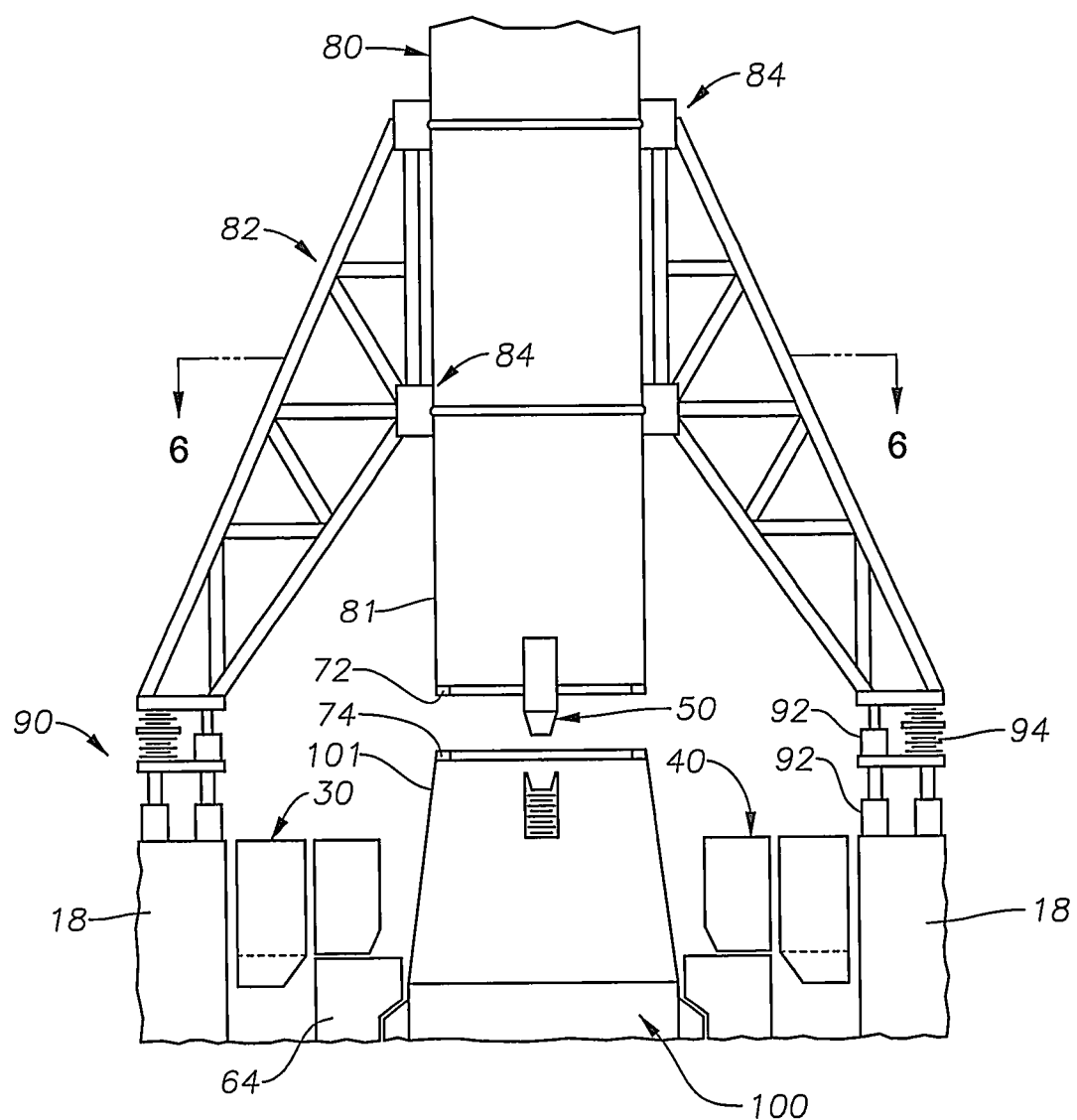
FIG. 5 is a partial elevation view of a support frame mounted on the vessel forks supporting a wind turbine generator being positioned above the spar buoy.
Figure 6:
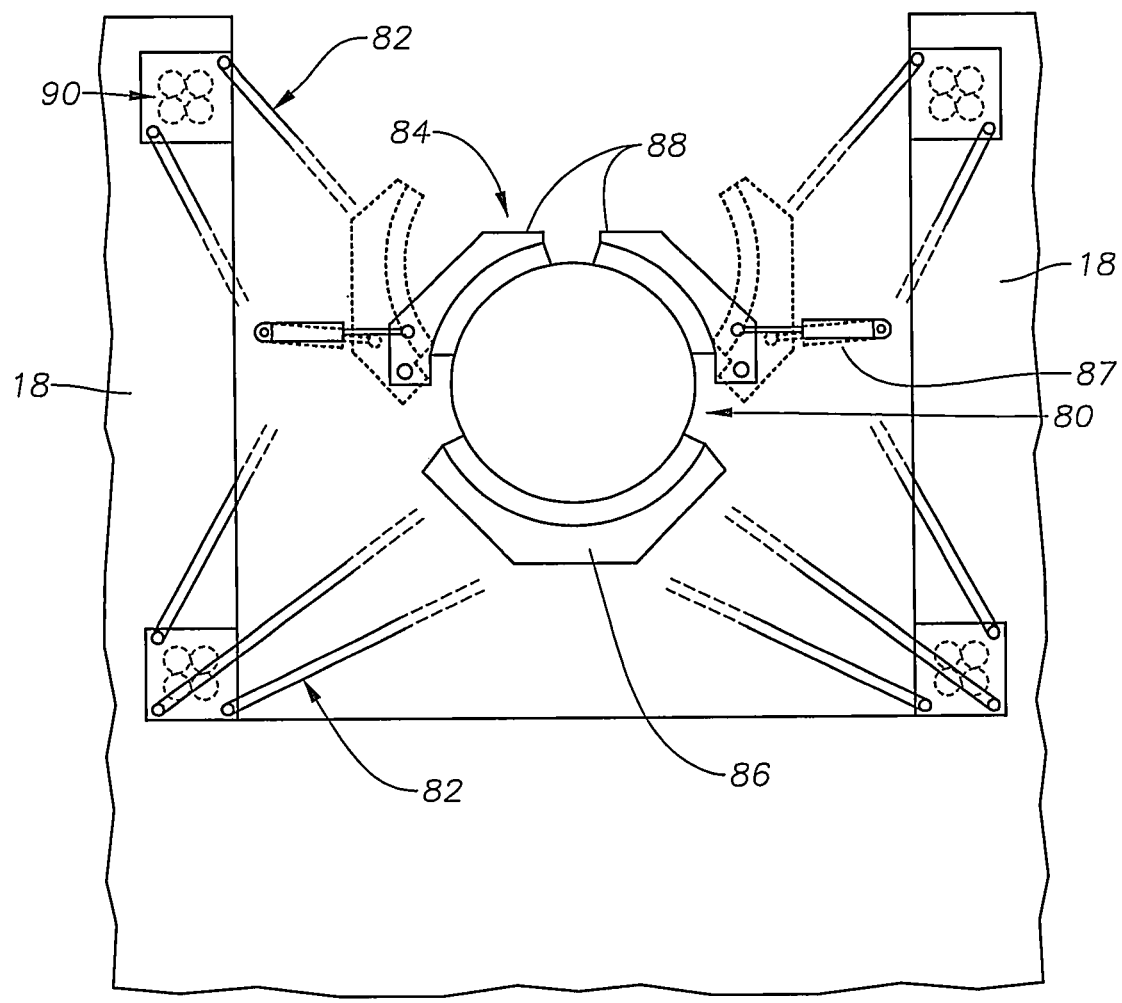
FIG. 6 is a section view taken along lines 6-6 of FIG. 5.

In the preferred embodiment as shown in FIG. 5, the vessel 10 includes a support frame assembly 82 for securing a wind turbine generator 80 during transportation of the wind turbine generator 80 to the offshore location of the spar buoy 100. In the preferred embodiment, the support frame assembly 82 is also used for lowering and attaching the wind turbine generator 80 to the spar buoy 100. Preferably, the wind turbine generator 80 is attached to the support frame assembly 82 with a plurality of releasable generator locking collars 84 that each include one fixed portion 86 and two actuated arms 88 that are actuated with hydraulic cylinders 87 to capture and fix the wind turbine generator 80 to the support frame 82 as shown in FIG. 6. It is to be understood that alternate locking mechanisms may be used.

Referring to FIG. 5, the lower end of the support frame assembly 82 is connected to a plurality of frame hydraulic mating units 90. In the embodiment as shown in FIGS. 5 and 6, four frame hydraulic mating units 90 are positioned between the support frame assembly 82 and the vessel forks 18. Each frame hydraulic mating unit 90 includes a series of cylinder jacks 92 and springs 94 to lower the support frame 82 and allow and dampen the relative rotational motions between the spar buoy 100 and the vessel 10.

Figure 7:
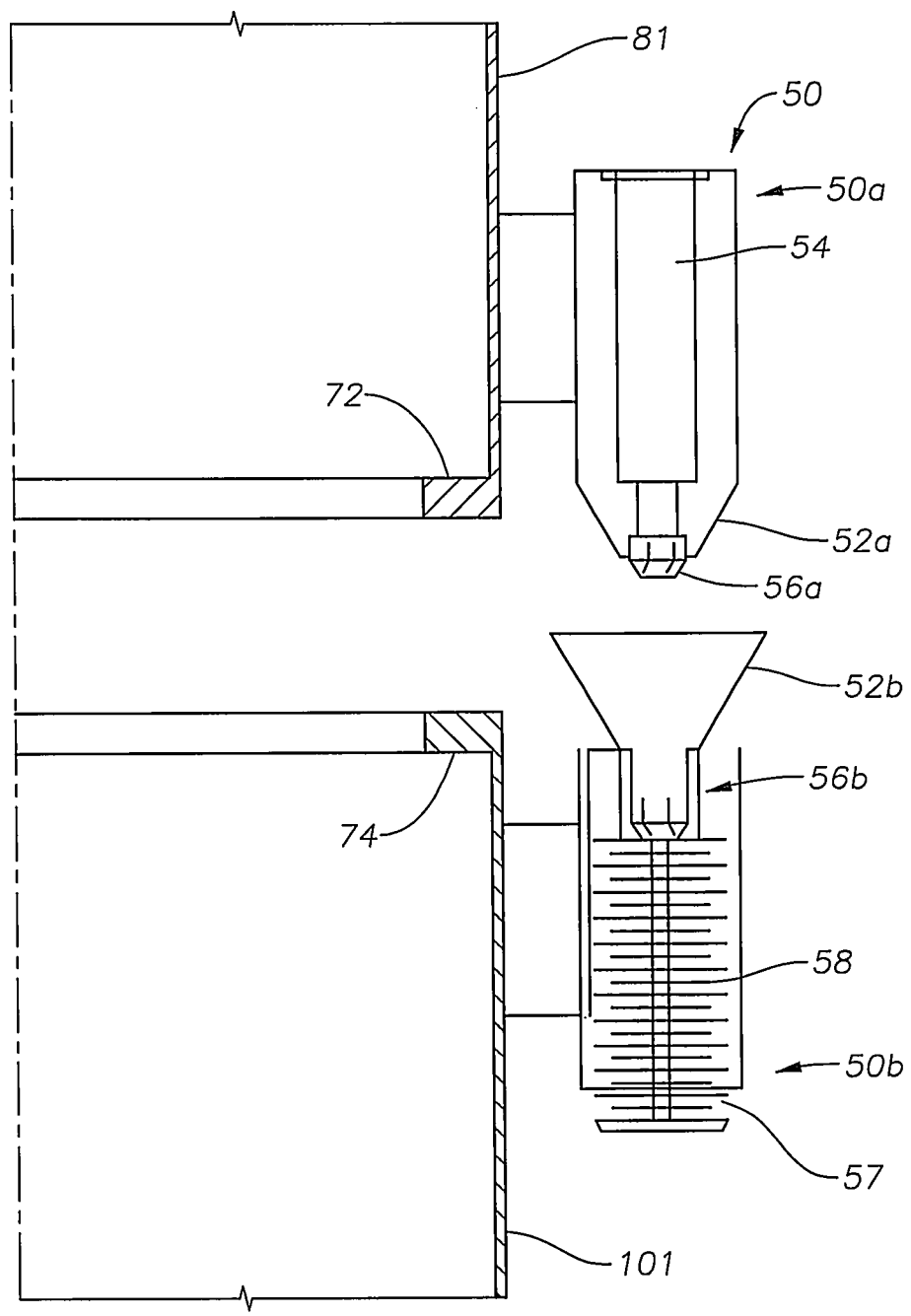
FIG. 7 is a partial elevation view showing the mating of a final alignment guide/connector of the wind turbine generator and the spar buoy.

Typically, the final connection of the wind turbine generator 80 to the spar buoy 100 is made by a bolted flange connection. The wind turbine generator 80 is lowered onto the spar buoy 100 in a controlled manner to reduce the impact load on the flanges 72 and 74 (FIG. 7). The flange 72 is preferably positioned inside a shell plate 81 of the wind turbine generator 80 and the flange 74 is preferably positioned inside a shell plate 101 of the spar buoy 100. This is accomplished with two main component assemblies: the plurality of frame hydraulic mating units 90 (FIG. 5) and a plurality of final alignment guide/connectors 50 (FIGS. 5 and 6). It is to be understood that while only one final alignment guide/connector 50 is shown, preferably a plurality of guide/connectors 50 are used in the system.

The main functions of the plurality of frame hydraulic mating units 90 are:

Locking or fixing the support frame assembly 82 to the vessel 10 during transportation;

Resisting overturning of the wind turbine generator 80;

Lowering the wind turbine generator 80 onto the spar buoy 100 and transferring the weight of the wind turbine generator 80 to the spar buoy 100;

Absorbing relative motions of the spar buoy 100 and vessel 10 during and after mating of the wind turbine generator 80 to the spar buoy 100;

Working in unison with the final alignment guide/connectors 50 to transfer motions of the spar buoy 100 to the support frame assembly 82 during mating; and Spring stiffness is stiff early in the mating process and soft once the wind turbine generator 80 is mated to the spar buoy 100. The springs 94 become softer after weight transfer of the wind turbine generator 80 to the spar buoy 100. The preferred embodiment uses a compound spring system with a dual slope force deflection curve.

Preferably, there are four final alignment guide/connectors 50 placed outside the flanges 74, 72 on the spar buoy 100 and wind turbine generator 80, respectively. The final alignment guide/connectors 50 will absorb the impact loading between the wind turbine generator 80 and the spar buoy 100 upon initial contact. Referring to FIG. 7, the final alignment guide/connector 50 includes a pair of mating (male and female) final alignment cones 52a and 52b. Preferably, an upper portion 50a of the final alignment guide/connector 50 includes a connector engagement cylinder 54 and a male connector 56a. A lower portion 50b of the final alignment guide/connector 50 includes a female connector 56b, an uplift spring 57 and a main spring 58. The main spring 58 reduces impact load and may be an elastomeric spring. The male and female connectors 56a and 56b, respectively, may be of the rotary latch connector type. For example, the connector engagement cylinder 54 is "pushed" and reaches down and extends to engage the latch and pulls up to lock. When the connector engagement cylinder 54 is "pushed" again it reaches down and extends to unlock and disengage the latch. It is to be understood that other forms and types of connectors known to persons of ordinary skill in the art may be used.

The main functions of the final alignment guide/connectors 50 are:
- Transitioning load and motion of the wind turbine generator 80 from the vessel 10 to the spar buoy 100;
- Providing guided alignment of the wind turbine generator 80 to the spar buoy 100;
- Containing shock absorbers to eliminate/reduce flange 72 to flange 74 impact load;
- Working in unison with the frame hydraulic mating units 90 to transfer load and motions; and
- Containing locking mechanism to attach the wind turbine generator 80 to the spar buoy 100 and drive spar buoy 100 angular motions into the frame hydraulic mating units 90.

The mating process is summarized in the following steps:

1. The vessel 10 arrives on site with the wind turbine generator 80 attached to the mounting/support frame assembly 82 in transit mode.

2. The vessel 10 approaches spar buoy 100 with the spar locking collar 60 in the open position, attaches a hawser (not shown) and pulls the vessel 10 to the spar buoy 100 in proper orientation and draft. The spar buoy 100 and vessel 10 are pulled together so that the spar locking collar receptacle 68 engages with the corresponding feature 102 on the spar buoy 100.

3. Once contact between the spar locking collar 60 and spar buoy 100 is obtained, the locking collar pivoting grippers 64 are closed and the spar buoy 100 is fixed to the gimbal inner table 40. The ability to align and make this initial contact is a key feature of the gimbal table 20. The spar locking collar 60 and inner table 40 aligns itself with the spar buoy 100 during locking/engagement.

4. The wind turbine generator support frame assembly 82 is removed from transit lock condition and is lowered with the plurality of frame hydraulic mating units 90 to obtain contact of the wind turbine generator 80 to the spar buoy 100.

5. The final alignment guide/connectors 50 make first contact and absorb initial impact loading. The connectors 50 are engaged and the weight of the wind turbine generator 80 is transferred to the spar buoy 100 and inner table 40.

6. Flange bolting is installed and tensioned.

7. The spar buoy 100 and vessel 10 are ballasted so that the spar buoy 100 takes the weight of the wind turbine generator 80.

8. The wind turbine generator locking collars 84 are released. It may be desired at this point to move the frame toward the center of the vessel 10 and away from the tower in order to avoid clashing.

9. The spar locking collar 60 is released.

10. The vessel 10 releases the hawser and backs away from the spar buoy 100.

As discussed above, the mating of a wind turbine generator 80 to a spar buoy 100 is a difficult and expensive offshore installation task. The use of the fork-type vessel 10 is more economical than a vessel with a large offshore crane, but the motion response to the wave environment of the spar buoy 100 and a ship shape vessel 10 are radically different. The invention makes use of a gimbal table 20 that grips the spar buoy 100 from the bow or stern of the fork-type vessel 10 and eliminates the relative vertical motion between the spar buoy 100 and the vessel 10 while allowing the vessel 10 to roll and pitch freely without driving the effects of the angular motions into the spar buoy 100.

The support frame assembly 82 that supports the wind turbine generator 80 is preferably mounted on a spring system to allow the angular relative motions of the spar buoy 100 to be absorbed between the support frame assembly 82 and vessel 10 during mating of the wind turbine generator to the spar buoy 100. The wind turbine generator 80 is lowered onto the spar buoy 100 in a very controlled manner with greatly reduced relative motions and loads. This decreases the installation risks and enables installation in larger sea states.

This invention includes an installation method and mating system to install a wind turbine generator 80 to a floating hull such as a spar buoy 100. The system consists of a gimbal table 20 to allow connection of the vessel 10 to the spar buoy 100 and a mounting/support frame assembly 82 to secure the wind turbine generator 80 and lower the wind turbine generator 80 onto the spar buoy 100. The support frame assembly 82 is attached to the vessel 10 by means of a frame support mating unit 90 that can lower the frame assembly 82 and isolate the motions of the spar buoy 100 from the vessel 10 during and after connection. Also, final alignment stabbing guide/connectors 50 are used to absorb initial contact between the spar buoy 100 and the wind turbine generator 80 and provide final alignment and connection so that flange bolting can be installed.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A system for mating equipment offshore, the system comprising:
a floating vessel having a pair of structural projections defining a slot;
a gimbal table positioned within the slot and connected to the vessel, the gimbal table defining an opening, wherein the gimbal table comprises:
an outer table substantially U-shaped having an open end in plan view, the outer table being pivotably connected to the vessel, and an inner table substantially U-shaped having an open end in plan view, the inner table fitting within the outer table and being pivotably connected to the outer table;
a locking collar mounted to the gimbal table; and
a mating member attached to a floating hull, wherein:
the floating hull is not directly supported by a sea floor, and
when the floating hull is positioned within the opening defined by the gimbal table, the locking collar is arranged and designed to releasably attach to the mating member and restrict relative vertical motion between the floating hull and the vessel while the gimbal table allows the floating vessel to roll and pitch without driving these motions into the floating hull.

2. The system of claim 1, wherein the locking collar comprises:
a fixed gripper affixed to the gimbal table; and
at least one pivoting gripper attached to the gimbal table arranged and designed to capture the floating hull upon closure of the locking collar.

3. The system of claim 2, wherein the at least one pivoting gripper is hydraulically controlled.

4. The system of claim 2, wherein the at least one pivoting gripper comprises a pair of pivoting grippers.

5. The system of claim 1, wherein the mating member is a toroid-shaped member and the locking collar includes a receptacle for mating with the toroid-shaped member.

6. The system of claim 1, further comprising a support frame assembly mounted to the vessel, the support frame assembly arranged and designed to support equipment above the gimbal table.

7. The system of claim 6, further comprising a plurality of frame hydraulic mating units positioned between the support frame assembly and the pair of structural projections, the plurality of frame hydraulic mating units arranged and designed to lower the support frame assembly.

8. The system of claim 7, wherein each of the plurality of frame hydraulic mating units comprises a series of cylinder jacks and springs to lower the support frame assembly and dampen relative rotational motions between the floating hull and the vessel.

9. The system of claim 7, wherein the equipment comprises a wind turbine generator, and wherein the floating hull comprises a spar buoy.

10. The system of claim 6, wherein the support frame assembly includes at least one releasable locking collar arranged and designed to releasably attach to the equipment and restrict relative vertical motion between the equipment and the support frame assembly.

11. The system of claim 6, further comprising a plurality of final alignment guides and connectors comprising an upper portion arranged and designed to mate with a lower portion, the upper portion of the final alignment guides and connectors attached to the equipment and the lower portion attached to the floating hull.

12. The system of claim 11, wherein each of the final alignment guides and connectors comprises a main spring arranged and designed to absorb impact loading between the equipment and the floating hull upon initial contact.

13. The system of claim 1, wherein the open end of the outer table and the open end of the inner table are arranged and designed to allow the floating hull to pass therethrough to position the floating hull within the opening defined by the gimbal table.

14. A system for mating equipment offshore, the system comprising:

a floating vessel having a pair of structural projections defining a slot;
a gimbal table positioned within the slot and connected to the vessel, the gimbal table defining an opening;
a locking collar mounted to the gimbal table; and
a mating member attached to a floating hull,
wherein when the floating hull is positioned within the opening defined by the gimbal table, the locking collar is arranged and designed to releasably attach to the mating member and restrict relative vertical motion between the floating hull and the vessel while the gimbal table allows the floating vessel to roll and pitch without driving these motions into the floating hull, and
wherein the gimbal table comprises:
an outer table substantially U-shaped having an open end in plan view, the outer table being pivotably connected to the vessel; and
an inner table substantially U-shaped having an open end in plan view, the inner table fitting within the outer table and being pivotably connected to the outer table.

15. The system of claim 14, wherein the locking collar is mounted to the inner table.

16. A method for installing equipment offshore, the method comprising:
outfitting a vessel with a gimbal table and a support frame assembly, wherein the gimbal table is positioned within a slot defined by a pair of structural projections of the vessel, and wherein the gimbal table comprises:
an outer table substantially U-shaped having an open end in plan view, the outer table being pivotably connected to the vessel, and
an inner table substantially U-shaped having an open end in plan view, the inner table fitting within the outer table and being pivotably connected to the outer table;
loading and securing the equipment on the vessel,
transporting the equipment to a floating hull using the vessel, wherein the floating hull is not directly supported by a sea floor;
maneuvering the vessel to bring the floating hull within an opening defined by the gimbal table;
closing a locking collar, mounted to the gimbal table, into locking engagement with the floating hull;
lowering the equipment onto the floating hull;
connecting the equipment to the floating hull;
adjusting a ballast of at least one of the vessel and the floating hull so that the floating hull supports the weight of the equipment;
releasing the equipment from the support frame assembly;
opening the locking collar to release the floating hull; and
maneuvering the vessel away from the floating hull.

17. The method of claim 16, wherein closing the locking collar into locking engagement with the floating hull comprises a locking collar receptacle engaging a corresponding mating feature on the floating hull.

18. The method of claim 16, wherein lowering the equipment comprises lowering the support framne assembly via a plurality of frame hydraulic mating units.

19. The method of claim 16, wherein releasing the equipment from the support frame assembly comprises unlocking a plurality of locking collars of the support frame assembly.

20. The method of claim 16, wherein connecting the equipment to the floating hull comprises engaging an upper portion of a plurality of final alignment guides and connectors mounted to the equipment to a lower portion of the plurality of final alignment guides and connectors mounted to the floating hull.

21. The method of claim 20, wherein connecting the equipment to the floating hull further comprises bolting an equipment flange to a floating hull flange.

22. The method of claim 16, wherein the equipment comprises a wind turbine generator, and wherein the floating hull comprises a spar buoy.

23. The method of claim 16, wherein during maneuvering of the vessel to bring the floating hull within the opening defined by the gimbal table, the floating hull passes through the open end of the outer table and the open end of the inner table.

* * * * *

UNITED STATES PATENT AND TRADEMARK OFFICE
CERTIFICATE OF CORRECTION

Page 1 of 1

PATENT NO. : 10,975,541 B2
APPLICATION NO. : 15/695802
DATED : April 13, 2021
INVENTOR(S) : Stephen P. Lindblade and Ananth Natarajan It is certified that error appears in the above-identified patent and that said Letters Patent is hereby corrected as shown below:

In the Claims

Column 8, Line 57: In Claim 18, delete "framne" and insert --frame--.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*